United States Patent [19]
Nagazumi

[11] 3,929,203
[45] Dec. 30, 1975

[54] MOUNTING DEVICE FOR SHOULDER HARNESS TYPE SAFETY BELT

[75] Inventor: Yasuo Nagazumi, Tokyo, Japan

[73] Assignee: Nissan Motor Company Limited, Yokohama, Japan

[22] Filed: Jan. 17, 1974

[21] Appl. No.: 434,036

[30] Foreign Application Priority Data
Jan. 19, 1973 Japan.................................. 48-8391

[52] U.S. Cl. .......................... 180/82 C; 280/150 SB
[51] Int. Cl.² ......................................... B60R 21/10
[58] Field of Search ............. 180/82 C; 280/150 SB; 297/385, 389

[56] References Cited
UNITED STATES PATENTS

| | | | |
|---|---|---|---|
| 2,349,109 | 5/1944 | O'Keeffe | 280/150 SB X |
| 2,401,748 | 6/1946 | Dillon | 280/150 SB X |
| 2,891,804 | 6/1959 | Frayne | 280/150 SB |
| 2,900,036 | 8/1959 | Blake | 280/150 SB X |

*Primary Examiner*—Leo Friaglia
*Assistant Examiner*—Terrance L. Siemens

[57] ABSTRACT

A link bar, supporting one end of a shoulder harness, is secured through a support to a portion of a vehicle body yieldable to the displacement of an engine so that it is movable longitudinally rearwardly when the engine is plunged into a passenger room due to a collision of a vehicle, thereby tightening the harness which has loosely encircled around the passenger in normal operation of the vehicle.

8 Claims, 7 Drawing Figures

MOUNTING DEVICE FOR SHOULDER HARNESS TYPE SAFETY BELT

This invention relates to safety belts for automotive vehicles and more particularly to mounting and arresting device for belts of the shoulder-harness type.

The shoulder harness type of belt is widely used in modern cars and other fast moving vehicles to protect passengers thereof from the so-called "second collision". It is first required for the belts of this type that they serve an enough restraining function in the event of a sudden collision. To ensure this function, the belts should be tightly buckled on the passenger body without excessive slack. However, it is also necessary that the belts are so loose that the passenger has sufficient freedom to perform normal body movements, because otherwise the passenger will be reluctant to wear the belts or will unfasten them sooner or later during a long drive.

There have been heretofore proposed many improvements intended to meet these contradictory requirements. Most of them is however found impractical due to their complicated construction, often requiring hydraulic or electric actuating means.

It is therefore a general object of the invention to provide a safety belt system which effectively restrains sudden forward movement of the passenger in a collision without sacrificing the ease and comfortability of operation of vehicle in normal driving condition.

A specific object of the invention is to provide an improved shoulder harness mounting device which supports the shoulder harness around the passenger body relatively loosely in a normal operation of the vehicle while suddenly tightening it as soon as a collision occurs.

A further object of the invention is to provide a shoulder harness mounting device of the type described above which is simple in construction and can be easily manufactured with reduced production cost.

Still further objects and advantages of the present invention will readily occur to one skilled in the art to which the invention pertains upon reference to the following description and the accompanying drawings, in which FIG. 1 is a diagrammatic side view of the interior of a vehicle and a seat therein equipped with a device according to a preferred embodiment of the invention, showing a normal driving condition of the vehicle.

Figure 1:
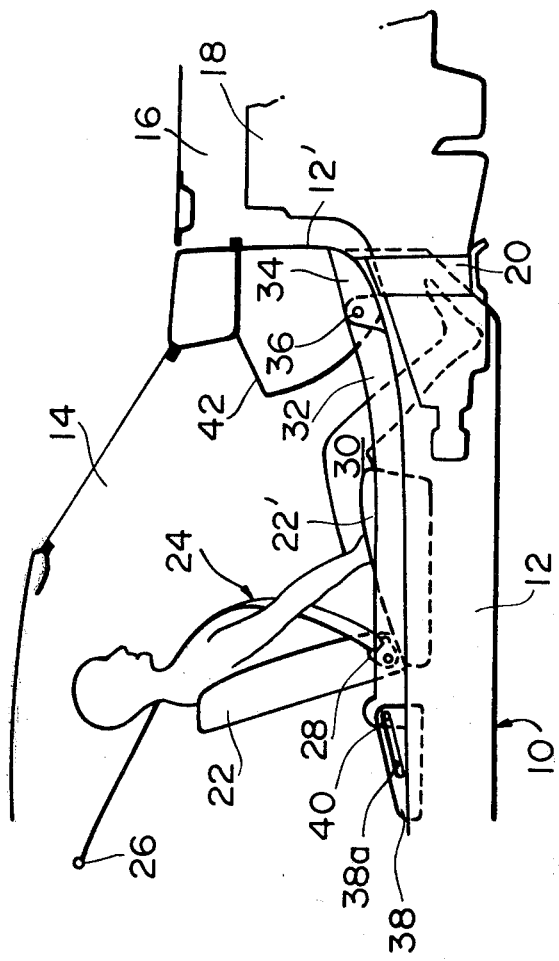
Figure 2:
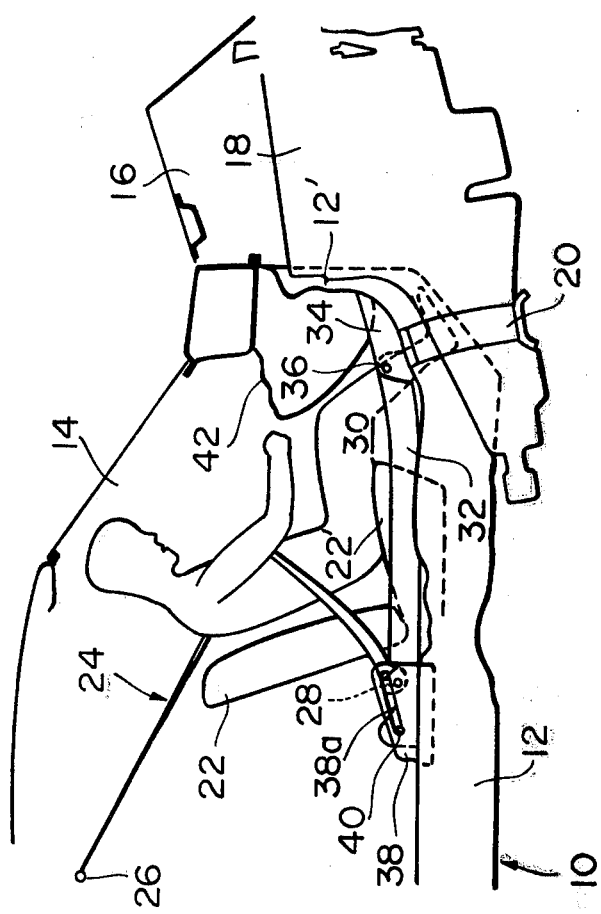
FIG. 2 is a view like FIG. 2 but showing a collision condition of the vehicle.

In FIGS. 1 and 2, the interior of a vehicle body 10 is conventionally divided into a passenger room 14 and an engine room 16. The passenger room 14 accommodates a seat 22 mounted on a floor panel 12 of the body 10, on which a passenger or a driver is shown to assume a seated position. An engine 18 of any type is located in the engine room 16 and is supported on an engine mount member 20. The passenger is provided with a shoulder harness 24 having its upper end 26 anchored to any suitable, unyielding portion of the body 10 behind the seat 20. The shoulder harness 24 then loosely extends across the chest of the passenger and is detachably connected at its lower end, by means of an anchor buckle 28, to a link bar 32 that will be hereinafter described.

Figure 5:
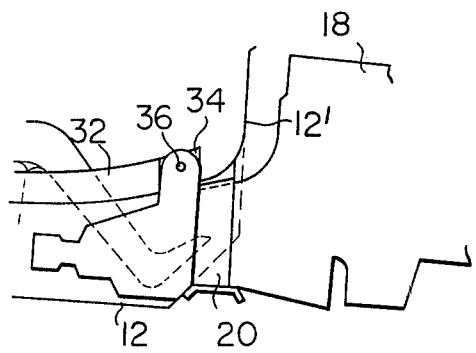
FIGS. 5 and 6 are partial views like FIG. 1 but showing respectively alternative modifications of the device according to the present invention.
Figure 6:
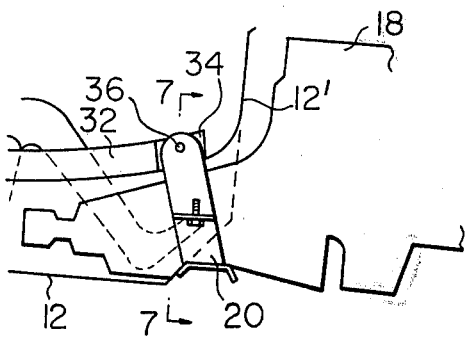
Figure 7:
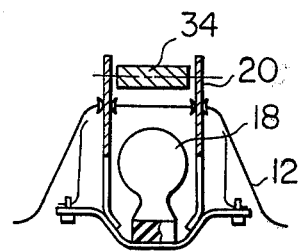
FIG. 7 is a view in section taken along the line 7—7.

The link bar 32, forming part of a shoulder harness mounting device 30 according to the invention, is arranged longitudinally of the vehicle body 10 substantially along a horizontal portion 22' of the seat 22. The mounting device 30 further comprises a front support bracket 34 which is secured or joined to a front floor portion or dashboard 12' continuing from the floor panel 12. The forward end of the link bar 32 is fast connected to the front bracket 34 by means of a pin 36. To a portion of the floor panel 12 behind the seat 22 fixed is a rear support bracket 38 having an elongate guide slot 38a. The rear end of the link bar 32 is connected to the rear bracket 38 by means of a pin 40 received in the slot 38a so that a limited longitudinal movement guided by the slot 38a is allowed the pin 40 and the link bar 32. Although the front end of the link bar 32 is secured to the dashboard 12' in the described embodiment, it may be connected directly to a rear side of the engine 18 or may be supported on the mount member 20 as illustrated in FIGS. 5 to 7. As the use of a lap belt type restraint, which also obstructs the normal passenger movements, is impractical in the embodiment of the invention, it is preferable to provide protecting means 42 of a resilient cushion pad type as shown between the passenger lap and the dashboard 12'.

It will be readily understood that the passenger seated and wearing the shoulder harness 24 can enjoy freedom of movement to a considerable degree, for instance, to tune a radio, pay a toll or back the vehicle, in a normal driving condition shown in FIG. 1. At the moment of collision, the rear part of the engine 18 forcibly bumps against the dashboard 12' and is plunged into the passenger room 14 deforming the dashboard 12'. As the dashboard 12' yields to the strong push of the engine as can be seen in FIG. 2, the bracket 34 secured to the dashboard 12' and its connecting pin 36 are forced rearward and tends to displace also the link bar 32 in the same direction. Since the pin 40 slides along the inner surfaces of the slot 38a of the rear bracket 38, the link bar 32 is permitted to move rearward until the pin 40 abuts the rear end of the slot 38a. Consequently, the anchor buckle 28 connecting the shoulder harness 24 to the link bar 32 is positioned behind the seat 22, thus tightly fastening the shoulder harness 24 around the body of the passenger.

A number of crash tests conducted by me reveal that, in case of compact passenger cars, the maximum degrees in which the heads of test dummies move forward occur in most cases in a period from about 80 to 100 milli/sec. after the moment of the collision. It is also confirmed through experiments that, the engine, due to its high rigidity, is able to deform the dashboard enough to push a part of the engine into the passenger room in a relatively short length of time from 60 to 80 milli/sec. after the collision. It will be thus seen that according to the invention the shoulder harness is successfully tightened just before the critical moment at which the passenger is thrown forward.

It would be also appreciated that the device according to the invention is so simple that no hydraulic, electric, or too complicated mechanical control means is necessary and can be easily assembled with cars and vehicles presently in use.

A wider harness strap or a belt of the type expansible by a pressurized gas have to be employed to dissipate or cushion local pressure exerted on the chest of the passenger.

Figure 3:
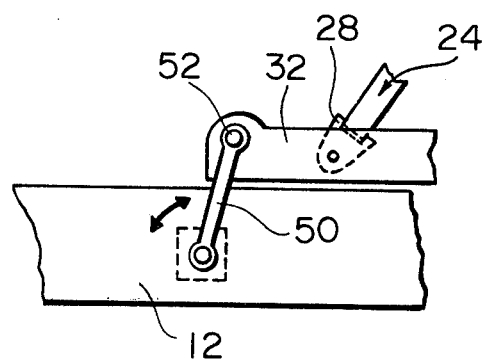
FIG. 3 is a fragmentary side view showing modification of an important part of a device shown in FIGS. 1 and 2.

Referring to a modified embodiment shown in FIG. 3, the rear bracket 38 is omitted and instead a link lever 50 is at one end pivotally mounted on the floor panel 12. The other end of the lever 50 is fixed to the rear end of the link bar 32 by means of a pin 52 so that the link bar 32 is movable about the pivotal axis of the lever 50. The operation of the link bar 32 upon a collision is thus like the aforementioned embodiment shown in FIGS. 1 and 2.

Figure 4:
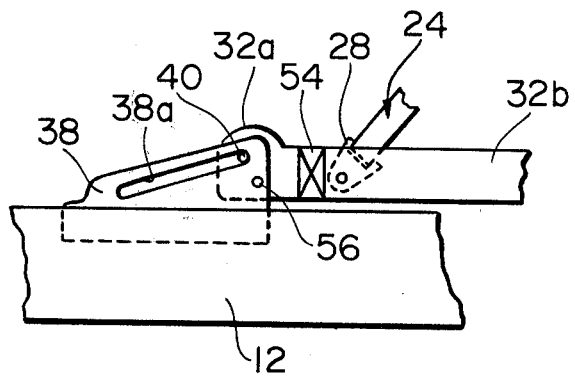
FIG. 4 is a view like FIG. 3 but showing another modification.

FIG. 4 shows another embodiment in which the link bar 32 forms a separate end portion 32a which is detachably connected to the main portion 32b of the link bar by connecting means 54. The end portion 32a is connected by the pin 40 to the bracket 38 having the guide slot 38a in the same manner as in FIGS. 1 and 2. This embodiment further comprises a shear pin 56 passing through the end portion 32a and the bracket 38. Thus the device according to this embodiment operates only when the link bar 32 is displaced with enough force and momentum to break the pin 56.

What is claimed is:

1. A mounting device for use with a vehicle having a front engine and a vehicle body accommodating a seat and a shoulder harness, comprising
   an elongate link disposed longitudinally of the vehicle on one side of the seat,
   anchor means detachably connecting one end of the shoulder harness to said link,
   a front support for the front end of said link movable rearward with said link upon displacement of the engine due to the collision of the vehicle, and
   a rear support for the rear end of said link secured to a stationary part of the vehicle body and having means permitting longitudinal rearward movement of said link relative to the vehicle body resulting from said displacement of the engine.

2. A mounting device as claimed in claim 1, wherein said front support is secured to the rear side of the engine.

3. A mounting device as claimed in claim 1, wherein said vehicle body includes a front floor portion separating the body into a passenger room and an engine room and wherein said front support is secured to said front floor portion.

4. A mounting device as claimed in claim 1, wherein said vehicle body includes an engine mount member supporting the engine and wherein said front support is secured to said engine mount member.

5. A mounting device as claimed in claim 1, wherein said rear support includes a bracket having an elongate guide slot cut therethrough and a connecting pin having one end secured to the rear end of said link and the other end slidably received in said guide slot.

6. A mounting device as claimed in claim 5, wherein said link is divided into a main portion and an end portion and includes means detachably connecting said main portion and said end portion.

7. A mounting device as claimed in claim 5, further comprising a shear pin passing through said link and said bracket.

8. A mounting device as claimed in claim 1, wherein said rear support includes a link lever having one end pivotally mounted on said vehicle body and the other end fastened to said link, said link lever being swung rearward of the vehicle body to permit said longitudinal movement of said link.

* * * * *